3,026,266
CATIONIC BITUMINOUS EMULSIONS
Edward W. Mertens and James R. Wright, El Cerrito, Calif., assignors to California Research Corporation, San Francisco, Calif., a corporation of Delaware
No Drawing. Filed Feb. 23, 1960, Ser. No. 10,106
10 Claims. (Cl. 252—311.5)

This invention relates to improvements in oil-in-water type cationic bituminous emulsions. In particular, it relates to cationic asphalt-in-water emulsions characterized by an unusually good adhesion to siliceous aggregates and by a reduced viscosity which persists, even upon storage, thus facilitating the handling of the emulsion on the way to and at the job site.

Although cationic bituminous emulsions have been described in the past, it is only recently that they began to be used in large volumes in this country for building and repairing of roads and in other types of pavement and surface-coatings.

While many of the techniques used in the manufacture and applications of anionic bituminous emulsions can be successfully adapted for use with cationic emulsions, a number of fundamental distinctions exist, nevertheless, between anionic and cationic asphalt emulsions, particularly in regard to their behavior when applied to stone aggregates. Thus, it is well known that anionic paving emulsions can be successfully employed but on predominantly electro-positive aggregates, such as limestone or dolomite. Where these aggregates are not available and one has to resort to the use of predominantly electro-negative aggregates, such as silica or quartz, anionic emulsions are ineffective, and the bituminous binder component thereof fails to form a permanent satisfactory coating on the surface of such aggregates.

Cationic paving emulsions, on the other hand, are effective on these electro-negative, mainly siliceous aggregates and conversely they are found generally to be ineffective on extremely electro-positive aggregates.

Usually, except in very dry areas, a certain amount of moisture is present on siliceous aggregates such as quartz. The presence of this moisture tends to reduce the adhesion of the bituminous binder to the surface of the aggregate, which ideally would be 100% coated with the binder. In reality, this is almost never the case. As a matter of fact, in a number of instances, only about 40 to 50% coverage (coating) of the total surface area of siliceous aggregates can be achieved with cationic paving emulsions on damp aggregates.

The ability of applying an adequate coating onto the aggregate surface with a cationic bituminous emulsion, in other words, the adhesion property of this emulsion, evidently constitutes one of the most important characteristics thereof and permits proper selection of a suitable cationic emulsified paving material.

In order to provide a true measure of comparison for bituminous emulsions, a special Stone-Coating Water Resistance test had been developed. The equipment for this test is that of the ASTM Coating Test D-244. In the test, a measured quantity of wet graded, highly siliceous aggregate with a water content equal to 2%, based on dry aggregate, is added with a spatula to a round-bottom one-quart metal pan. Then, a cationic emulsion prepared by emulsifying in water a suitable bitumen, e.g., asphalt, is emulsified with the aid of an appropriate amount of an effective cationic emulsifier. Some petroleum thinner may be added to soften the bitumen and to facilitate mixing the emulsion with the aggregate in the test. An appropriate amount of the emulsion is weighed into the aggregate in the pan and mixed vigorously therewith for two minutes. The percentage of the aggregate surface from which the emulsion strips off after these two minutes is estimated visually. Then the emulsion aggregate mixture is set aside in the pan containing the spatula at room temperature for 30 minutes. At the end of this period, the run-off of the emulsion is drained. The mixture which remains in the pan is drenched with cold tap water until the overflow runs clear. Excess water is drained off and the mixture dumped on absorbent paper. The extent in percent of the aggregate surface which remains coated with the binder is visually rated and is taken to be the percentage of adhesion. Adhesion values of 60% and higher are considered to be satisfactory.

It has now been found that oil-in-water cationic bituminous emulsions showing adhesion values of 60% and higher in the aforedescribed Stone-Coating Water-Resistance test can be produced by adding to and intimately distributing in the water, which will form the aqueous phase of the cationic emulsion about to be prepared, a small amount of a high molecular weight polyamide product of condensation of a particular kind of polycarboxylic acid and certain acyclic polyalkylene polyamines. Upon subsequent emulsification of the bitumen, e.g., an asphalt, in the so-treated water phase with a cationic emulsifier, an emulsion is formed which meets the viscosity specifications of the industrial practice and forms a satisfactory coating on the surface of the aggregate so that more than 60% of the surface stays coated.

The particular polyamide materials responsible for the reduction of viscosity and increased adhesion of the cationic bituminous materials of the present invention are products of condensation of polymerized linoleic acid, preferably dimeric (dilinoleic) acid, and essentially linear polyalkylene polyamines in which the alkylene units contain from 2 to 4 carbon atoms and are present in a number from 1 to 4. Condensation products of dilinoleic acid and corresponding polyethylene polyamines are particularly effective. Examples of polyamide materials operative in accordance with the present invention are condensation products of polymerized linoleic acids, preferably dilinoleic acid and polyalkylene polyamines, such as ethylene diamine, diethylene triamine, propylene diamine, isopropylene diamine, tetraethylene pentamine, dibutylene triamine and the like.

The aforedescribed polyamide materials are characterized by average molecular weights in the range from about 3000 to about 6500 and by softening points not higher than about 300° F. and will effectively reduce the viscosity and enhance the adhesion of cationic bituminous emulsions, when incorporated into these emulsions in amounts ranging from about 0.1 to about 1.5%, and preferably from about 0.1 to about 0.75% by weight of the finished emulsion. In their physical appearance, these polyamides vary from solid through semi-solid to liquid resinous materials, such as are sold, for instance, by General Mills, Inc., Chemical Division, of Kankakee, Illinois, under the common designation of "Versamids" and are prepared by one of the several processes described by A. G. Hovey in the Fall 1947 issue of "Progress Thru Research," a publication of General Mills, Inc.

In order to be able to reduce the viscosity of a cationic bituminous emulsion and to improve its adhesion to siliceous aggregates in accordance with the invention, the polyamide additives are introduced into the emulsion in the amounts from about 0.1 to about 1.5% by weight, for instance, by dissolving the polyamide in an asphalt heated to a temperature in the range from about 225 to about 300° F., and subsequently emulsifying the resulting asphalt-polyamide mixture in water in a conventional manner with the aid of a suitable cationic emulsifier.

Another method of introducing the polyamide into the emulsion, which is particularly convenient to apply in the case of cationic asphalt emulsions, is carried out by first adding the polyamide, heated if necessary to be fluid, to a dilute solution of a suitable acid, such as hydrochloric acid. Thereupon, the mixture is adequately agitated to produce a cationic suspension or emulsion, in which the hydrochloride or a like salt resulting from the reaction of the polyamide with the acid acts as the emulsifier. This suspension or emulsion is then added to the water intended as the aqueous phase of the cationic bituminous emulsion about to be prepared prior to the emulsification therein of bitumen. Amounts from about 0.1 to about 1.5% by weight of the polyamide may be employed, and the best results are achieved by introducing from about 0.1 to about 0.75% by weight of the finished bituminous emulsion. After the formation of the polyamide suspension, bitumen is emulsified in the water containing the polyamide additive in the usual manner using suitable equipment with the aid of a conventional cationic emulsifier. In ordinary practice, the polyamide may be emulsified in the water which is to be used for emulsifying the bitumen. In all events, care must be taken that the pH of the emulsifying water is such that the pH of the finished bituminous emulsion will be acid.

The final emulsion will contain from about 50 to about 75 parts by weight of bitumen. Particularly satisfactory emulsions suitable for various applications as surface-coatings and in the construction and repair of the road pavement are those containing from about 55 to about 70% by weight of bitumen. Bitumens which may be employed for the preparation of these emulsions containing polyamides in accordance with the invention, in addition, to including asphalts, whether natural or derived from petroleum refining, for instance, by steam refining and/or air blowing, also include coal tar, coal tar pitch, gilsonite and the like. The emulsions which may thus be improved by the addition of polyamides include those known as Rapid-Setting ones (RS), i.e., those which withstand rainfall 30 minutes after having been applied as seal coats onto the aggregate of the road bed, and Coarse-Mix (CM) emulsions, that is, those which are mixed with the aggregate in the so-called "Motopaver" equipment on the job. They also include the so-called Dense-Mix (DM) cationic emulsions recommended for soil-stabilization work and for slurry-seal surface treatments.

Tentative specifications set up in the industry for the viscosity of RS asphalt emulsions indicate a maximum viscosity of 400 SSF at 122° F., while the maximum viscosity of CM emulsions is set at 500 SSF at the same temperature, and the viscosity of DM emulsions may range from 20 to 400 SSF at 122° F. The presence of polyamide additives reduces the viscosity of cationic emulsions below these maxima and facilitates their spraying onto the road bed and their intimate mixing with the aggregate in the "Motopaver" mixers.

Adhesion to the aggregate is likewise improved owing to the presence of the polyamide, often by as much as 30 to 40%, as will be shown later on in this description by representative test data.

As a matter of fact, the more polyamide is added within the indicated operative range from about 0.1 to 1.5% and preferably from about 0.10 to about 0.75% by weight, the lower is the viscosity of the emulsion, and surprisingly, this viscosity, even after a relatively extended storage up to as much as 8 days at 140° F. does not vary significantly so as to exceed the maximum specification.

Any suitable cationic emulsifier capable of emulsifying bitumen in water may be employed to prepare the cationic bituminous emulsions of the present invention, including cation-active salts of quaternary nitrogen bases, such as quaternary ammonium halides, halide salts of cyclic quaternary nitrogen bases where from 2 to 3 valences on the nitrogen atoms are joined to carbon atoms in a cyclic configuration as, for instance, in 1,2-substituted imidazolinium chlorides, and other like cation-active monovalent salts of quaternary nitrogen bases. Other emulsifiers which may be also used are salts of fatty amines, preferably of straight-chain primary fatty amines, as well as combinations of salts of quaternary nitrogen bases and salts of fatty amines.

The emulsions may also contain small proportions, from 1 to 12% by weight, of a conventional hydrocarbon cutter stock, e.g., naphtha, to facilitate handling, pumping and spraying. The presence of this cutter stock has no adverse effect on the improvement of adhesion brought about by the presence of the polyamide additive.

Furthermore, the emulsion may comprise small amounts of different additives conventionally employed in the art of bituminous emulsions to stabilize them or to impart desirable improvements of one or several properties thereof, provided, however, that these additives do not detract from the beneficial action of the polyamides.

A large number of cationic emulsifier materials availableable in commerce under different trademarks may be employed for the preparation of cationic emulsions in accordance with the present invention. These materials are, to cite but a few:

"Emcol–11" of Emulsol Corporation of Chicago, Illinois, which is N-alkyl benzyl N,N,N-triethyl ammonium chloride with the alkyl group averaging 12 carbon atoms.

"Arquad T" and "Arquad S" of Armour and Company of Chicago, Illinois, which are $C_{14}$–$C_{18}$-alkyl trimethyl ammonium chlorides with the alkyl group being derived from tallow and soybean oil, respectively.

"Nalquats," manufactured and sold by Nalco Chemical Company of Chicago, Illinois. This name designates various quaternary imidazolinium bases; "Nalquat G–9–13" denoting 1-(2-hydroxyethyl)-2-heptadecenyl-1-(or 3)-(4-chlorobutyl)imidazolinium chloride.

"Hyamine 2389" which is an N-alkyl methyl benzyl-N,N,N-trimethyl ammonium chloride with an average of 12 carbon atoms in the alkyl chain. It is manufactured and sold by Rohm and Haas Chemical Company of Philadelphia, Pennsylvania.

Other commercial cationic emulsifers include "ATM–50" and "ADE–50" of Oronite Chemical Company of San Francisco, California, several "Tretolites" produced by Tretolite Company of St. Louis, Missouri, certain "Sapamines" produced and distributed by Ciba Company of Basel, Switzerland, etc.

It is believed that minor amounts of the starting materials ordinarily may be present in these different commercial emulsifiers as impurities of no consequence, however, to the operativeness of the emulsions prepared in accordance with the invention. These emulsifiers may be employed as concentrated solutions in water or in an alcohol, or in another suitable solvent and may contain minor amounts of stabilizers such as are conventionally used in the trade.

Emulsifier materials which provide in the emulsion from about 0.15 to about 1.5% weight of the active cationic component based on the finished emulsion are generally employed to emulsify the bitumen in water. More or less of the emulsifier material, however, may be employed, depending on factors such as the cost of the emulsifier, its effectiveness for emulsification, the amount of bitumen to be dispersed, etc. The following test data are offered to illustrate the improvements in cationic emulsions, occasioned by the addition of the polyamides in accordance with the invention.

Example I

A series of three asphalt-in-water cationic emulsions A, B and C was prepared. These emulsions contained 63% by weight of 200–300 penetration grade asphalt of Venezuelan origin and 1.1% by weight of N-alkyl benzyl-N,N,N-trimethyl ammonium chloride, a material sold in the form of a 50% solution in isopropanol under the trademark "ATM-50" by Oronite Chemical Company. Emulsion A contained no polyamide additive. Emulsion B contained 0.2% of an additive (as 36% solids in cationic emulsion form), this additive being a cationic suspension of polyamide material sold by General Mills, Inc., under the name of "Versamid A-000." This material is a product of condensation of polymerized linoleic acid and a polyalkylene polyamine. It has an average molecular weight of 3000–6500 and a softening point of 194 to 212° F. (ASTM method D36-26). Emulsion C contained 0.4% of a similar additive.

Stone-Coating Water-Resistance Test described hereinbefore, and hereinafter designated in this description of the invention as SCWR Test, was carried out on all three emulsions. The results are tabulated below.

| Emulsion | Polyamide Added in Percent | Adhesion in Percent (SCWR Test) |
|---|---|---|
| A | 0 | 50 |
| B | 0.2 | 80 |
| C | 0.4 | 70 |

It is clearly seen from these results that the adhesion property was substantially enhanced by the presence of the polyamide in the emulsions.

Example II

In this test series, two emulsions, D and E, of the same Venezuelan asphalt were prepared as in the preceding example (using 63% of asphalt and 1.1% of ATM-50" as the emulsifier). Emulsion D contained no polyamide. Emulsion E received 0.2% by weight of a polyamide product (as 45% solids in cationic emulsion form) supplied by General Mills, Inc. under the trade name "Versamid E-200." This polyamide product had an average molecular weight of 3000–6500, and a softening point of 194–212° F. (ASTM D-36-26). The SCWR Test results were as follows: for Emulsion D, adhesion observed was 50%, i.e., only half of the surface of the aggregate remained coated. For Emulsion E, adhesion was 80% indicating a 60% increase in the area of the aggregate which remained coated with asphalt after the test.

Example III

In another series of tests, four cationic emulsions, F, G, H and I were prepared using 65% by weight of the same 200–300 penetration graded Venezuelan asphalt and 0.55% by weight of a mixed emulsifier material. About 27% of this material (0.15% based on the weight of the finished asphalt emulsion) was a cationic quaternary ammonium chloride product sold by Armour and Company under the name "Arquad T-50." The balance of this mixed emulsifier to make 100% by weight (0.40% based on the weight of the finished emulsion) was a cationic fatty amine acetate product sold by Tretolite Company under the name "Tretolite X-1458." Water which was used as the aqueous phase in these asphalt emulsions was adjusted to a pH of 2.5 with HCl before emulsification, and to this water there were added various amounts of a polyamide material in cationic emulsion form, sold by General Mills, Inc., under the designation "Versamide A-000."

After overnight storage at 120° F., viscosity was determined in accordance with the procedure set forth in ASTM Standard Method D-244, using Saybolt-Furol viscometer at 122° F. These determinations were repeated after 8 days of storage at 140° F. The results are given in the following table.

| Emulsion | Polyamide additive in percent by wt. | Viscosity in SSF at 122° F. | |
|---|---|---|---|
| | | After overnight storage at 120° F. | After 8 days' storage at 140° F. |
| F | | 331 | 346 |
| G | 0.1 | 237 | 197 |
| H | 0.15 | 213 | 168 |
| I | 0.25 | 194 | 135 |

The results indicate that, while in the absence of the polyamide the viscosity tended to increase, the addition of polyamide markedly reduced viscosity, and that this reduction persisted on prolonged storage.

The SCWR Test carried out as described above on a siliceous gravel of Maryland origin, known to be a difficult-to-coat aggregate, indicated adhesion values of at least 95% and higher.

Example IV

In a similar test series four cationic asphalt emulsions, J, K, L and M were prepared as in Example III, employing 65% by weight of asphalt and 0.55% by weight of the same mixed emulsifier made up of "Arquad T-50" and "Tretolite X-1458," the difference being that each emulsion also contained 7.5% by weight of naphtha. The determination of viscosity, after storage overnight, again brought out the viscosity-reducing effect of the addition of polyamide, as may be seen from the following tabulation.

| Emulsion | Polyamide addition in percent by wt. | Viscosity in SSF at 122° F. After overnight storage at 120° F. |
|---|---|---|
| J | | 278 |
| K | 0.1 | 208 |
| L | 0.15 | 147 |
| M | 0.25 | 103 |

The adhesion, as observed again in the SCWR Test, was in all instances equal to at least 95% and higher.

Example V

In this test series, 5 cationic asphalt emulsions, N, O, P, R and S were prepared, with the asphalt content being equal to 65% and with 0.55% by weight of the same emulsifier made up of "Arquad T-50" and "Tretolite X-1548" being employed to form the emulsion. Four of these emulsions contained different proportions of the polyamide sold under the name "Versamid A-000," and all five of them contained 5% by weight of naphtha cutter.

Viscosity was determined as described hereinbefore with a Saybolt-Furol viscometer. The results of the viscosity determinations, after overnight storage at 120° F. and after 8 days at 140° F., are tabulated below.

| Emulsion | Polyamide additive in percent by wt. | Viscosity in SSF at 122° F. | |
|---|---|---|---|
| | | After overnight storage at 120° F. | After 8 days' storage at 140° F. |
| Q | | 339 | 454 |
| R | 0.1 | 193 | 309 |
| S | 0.25 | 90 | 195 |
| T | 0.50 | 70 | 107 |
| U | 1.00 | 69 | 63 |

Adhesion was also observed by subjecting the emulsions to the SCWR Test. Adhesion values were satisfactory and consistently exceeded the specified "passing minimum" of 60%.

Loss by run-off was practically nonexistent.

The aforegiven illustrative Examples I to V definitely indicate that the addition to cationic bituminous emulsions of the polyamide-type products of condensation of polymerized linoleic acid and polyalkylene polyamines brings about an unexpected reduction of viscosity of these emulsions and enhances the adhesion of the bituminous binder component thereof to siliceous aggregates under normal moisture conditions.

Although the invention is illustrated in the above description by examples which involve preparation of asphalt emulsions, since the use of these emulsions in road-paving work represents one of the most important applications of bituminous materials of the present times, it is to be understood that emulsions of other bituminous materials, such as gilsonite, pitch, coal-tar, and the like, can be similarly improved according to the invention by the presence of polyamide additives.

The above description and examples are intended solely to illustrate the invention, and, therefore, any variations thereof, apparent to those skilled in the art, are to be included in the scope of the appended claims.

We claim:

1. An oil-in-water type cationic bituminous emulsion consisting essentially of from about 50 to about 75% by weight of bitumen; from about 0.15 to about 1.5% by weight of a cationic emulsifier; from about 0.1 to about 1.5% by weight of a polyamide product of condensation of polymerized linoleic acid and a polyalkylene polyamine, the molecule of which is formed by $C_2$–$C_4$ alkylene units, less than five in number and one unit less than the number of amine units, said condensation product being characterized by an average molecular weight in the range from about 3000 to about 6500 and a softening point less than about 300° F.; and water as the continuous phase of the emulsion to make up 100% by weight.

2. An emulsion as defined in claim 1 wherein said bitumen is asphalt.

3. An oil-in-water type cationic bituminous emulsion consisting essentially of from about 50 to about 75% by weight of bitumen; from about 0.15 to about 1.5% by weight of a cationic emulsifier; from about 0.1 to about 0.75% by weight of a polyamide product of condensation of polymerized linoleic acid and a polyalkylene polyamine, the molecule of which is formed by $C_2$–$C_4$ alkylene units, less than five in number and one unit less than the number of amine units, said condensation product being characterized by an average molecular weight in the range from about 3000 to about 6500 and a softening point less than about 300° F.; and water as the continuous phase of the emulsion to make up 100% by weight.

4. An emulsion as defined in claim 3 wherein said bitumen is asphalt.

5. An oil-in-water type cationic bituminous emulsion consisting essentially of from about 55 to about 70% by weight of bitumen; from about 0.15 to about 1.5% by weight of a cationic emulsifier; from about 0.1 to about 1.5% by weight of a polyamide product of condensation of polymerized linoleic acid and a polyalkylene polyamine, the molecule of which is formed by $C_2$–$C_4$ alkylene units less than five in number and one unit less than the number of amine units, said condensation product being characterized by an average molecular weight in the range from about 3000 to about 6500 and a softening point less than about 300° F.; and water as the continuous phase of the emulsion to make up 100% by weight.

6. An emulsion as defined in claim 5 wherein said bitumen is asphalt.

7. An oil-in-water type cationic bituminous emulsion consisting essentially of from about 50 to about 75% by weight of asphalt; from about 0.15 to about 1.5% by weight of a cationic emulsifier; from about 0.1 to about 1.5% by weight of a polyamide product of condensation of polymerized linoleic acid and a polyethylene polyamine, the molecule of which has less than 5 ethylene units and one unit less than the number of amine units, said condensation product being characterized by an average molecular weight in the range from about 3000 to about 6500 and a softening point less than about 300° F.; and water as the continuous phase of the emulsion to make up 100% by weight.

8. An emulsion as defined in claim 7 wherein said product of condensation is a product of condensation of dilinoleic acid and ethylene diamine.

9. An emulsion as defined in claim 7 wherein said polyamide product of condensation is a product of condensation of dilinoleic acid and diethylene triamine.

10. An emulsion as defined in claim 7 wherein said polyamide product of condensation is a product of condensation of dilinoleic acid and tetraethylene pentamine.

References Cited in the file of this patent

UNITED STATES PATENTS

| | | |
|---|---|---|
| 2,317,959 | Johnson et al. | Apr. 27, 1943 |
| 2,550,476 | Hersberger | Apr. 24, 1951 |

FOREIGN PATENTS

| | | |
|---|---|---|
| 775,917 | Great Britain | May 29, 1957 |